Aug. 26, 1924. 1,506,009
G. S. LANE
FLUID PRESSURE BRAKE
Filed June 23, 1922
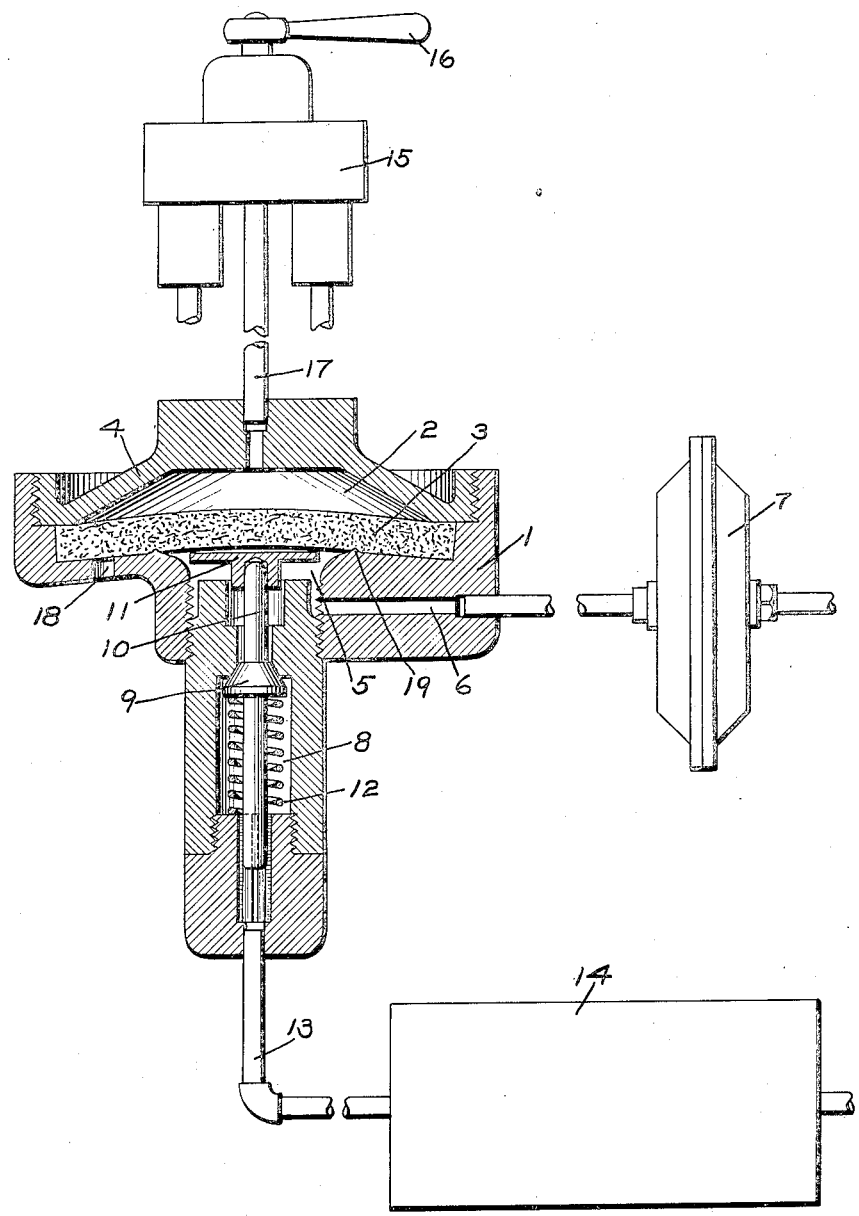
INVENTOR
GEORGE S. LANE
BY Wm. N. Cady
ATTORNEY Patented Aug. 26, 1924.

1,506,009

UNITED STATES PATENT OFFICE.

GEORGE S. LANE, OF SAN FRANCISCO, CALIFORNIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 23, 1922. Serial No. 570,372.

*To all whom it may concern:*

Be it known that I, GEORGE S. LANE, a citizen of the United States, residing at San Francisco, in the county of San Francisco and State of California, have invented new and useful Improvements in Fluid-Pressure Brakes, of which the following is a specification.

This invention relates to fluid pressure brakes more particularly adapted for use on automotive vehicles.

The principal object of my invention is to provide an improved quick application and release valve device for controlling the fluid pressure brakes.

In the accompanying drawing, the single figure is a diagrammatic view of an automotive vehicle brake showing the improved quick application and release valve device in section.

The quick application and release valve device may comprise a casing 1 having a chamber 2 in which is mounted a flexible diaphragm 3 adapted to be loosely held in position by means of a cover plate 4 having screw-threaded engagement with the casing 1.

The chamber 5 below the diaphragm 3 is connected by a pipe and passage 6 with a brake cylinder 7, which may be of the diaphragm type and contained in a valve chamber 8 of the casing is a poppet valve 9 having a stem 10 which loosely engages a diaphragm plate 11. The valve 9 is subject to the pressure of a coil spring 12 tending to hold the valve seated and the valve chamber 8 is connected by a pipe 13 with a reservoir 14 adapted to be charged with fluid under pressure.

A brake valve device 15 having an operating handle 16 is provided for controlling the admission and release of fluid under pressure through pipe 17 to and from the diaphragm chamber 2.

One or more exhaust ports 18 are provided through the wall of the casing 1 and are so positioned that said ports are controlled by the movement of the diaphragm 3 and in order to ensure sealing between the chamber 5 and the exhaust ports 18, an annular head or ring 19 may be provided at the interior of the casing wall.

In operation, if it is desired to effect an application of the brakes, the brake valve handle 16 is manipulated, so as to admit fluid under pressure to the diaphragm chamber 2. The diaphragm 3 is thereupon depressed, closing the exhaust ports 18, if not already closed and exerting pressure through the plate 11 on the valve stem 10 so as to open the application valve 9. Fluid under pressure is then supplied from the reservoir 14 to the chamber 5 and thence through pipe 6 to the brake cylinder 7 to effect an application of the brakes. When the brake cylinder pressure acting in chamber 5 has been increased to a predetermined degree, corresponding with the pressure in the diaphragm chamber 2, the valve 9 will be moved to its closed position by the spring 12, but without flexing the diaphragm sufficiently to open the exhaust ports 18, the position of the diaphragm being as shown in the drawing.

If it is desired to release the brakes, the brake valve handle 16 is turned so as to vent fluid from the diaphragm chamber 2, thus causing the higher fluid pressure, acting in chamber 5, to raise the diaphragm 3 and uncover the exhaust ports 18, so that fluid under presure is then released from the brake cylinder 7.

Having now described my invention, what I claim as new and desire to secure by Letters Patent, is:—

1. In a fluid pressure brake, the combination with a brake cylinder, of an application and release valve device comprising a casing containing a flexible diaphragm, a valve operated by said diaphragm for controlling the supply of fluid to the brake cylinder, and an exhaust port for controlling the release of fluid from the brake cylinder, said diaphragm acting as a valve to open and close said port.

2. In a fluid pressure brake, the combination with a brake cylinder, of an application and release valve device comprising a casing containing a flexible diaphragm, a valve operated by said diaphragm for controlling the supply of fluid to the brake cylinder, and an exhaust port through which fluid is released from the brake cylinder the diaphragm itself acting as a valve to close said port when said supply valve is opened.

3. In a fluid pressure brake, the combination with a brake cylinder, of an application and release valve device comprising a casing, a valve in said casing for controlling the supply of fluid under pressure to the brake cylinder, a flexible diaphragm operated by fluid under pressure for opening said valve, and an exhaust port through which fluid is released from the brake cylinder and adapted to be closed by the seating of the diaphragm thereon upon supplying fluid under pressure to said diaphragm.

4. In a fluid pressure brake, the combination with a brake cylinder, of an application and release valve device comprising a casing, a valve in said casing for controlling the supply of fluid under pressure to the brake cylinder, an exhaust port through which fluid is released from the brake cylinder, and a flexible diaphragm having one position in which said valve is opened and the exhaust port is closed directly by the diaphragm, another position in which the valve is closed and also the exhaust port, and a release position, in which the valve is closed and the exhaust port is opened.

5. In a fluid pressure brake, the combination with a brake cylinder, of an application and release valve device comprising a casing, a valve in said casing for controlling the supply of fluid under pressure to the brake cylinder, an exhaust port through which fluid is released from the brake cylinder, and a flexible diaphragm operated by fluid under pressure for directly closing said exhaust port and for opening said valve and operated by brake cylinder pressure for permitting said valve to close while holding the exhaust port closed.

6. In a fluid pressure brake, the combination with a brake cylinder, of an application and release valve device comprising a casing, a valve in said casing for controlling the supply of fluid under pressure to the brake cylinder, an exhaust port through which fluid is released from the brake cylinder, and a flexible diaphragm operated by fluid under pressure for directly closing said exhaust port and for opening said valve and operated by brake cylinder pressure for permitting said valve to close while holding the exhaust port closed and operated by a reduction in fluid pressure for opening said exhaust port.

In testimony whereof I have hereunto set my hand.

GEORGE S. LANE.